United States Patent Office 2,839,467
Patented June 17, 1958

2,839,467

BACTERICIDAL COMPOSITIONS AND METHOD OF BACTERIA CONTROL COMPRISING CERTAIN MIXTURES INCLUDING CERTAIN HYDROCARBYL IMIDAZOLINE MIXTURES

Charles Bryce Hutchison, Webster Groves, and William J. Ries, Clayton, Mo., assignors to Petrolite Corporation, Wilmington, Del., a corporation of Delaware No Drawing. Application August 3, 1955
Serial No. 526,322

14 Claims. (Cl. 252—8.55)

The present application is a continuation in part of our co-pending application Serial No. 514,394, dated June 9, 1955, now abandoned.

This invention relates to bactericidal compositions and also is concerned with a process of bacteria control, particularly from the standpoint of water flooding operations employed in the secondary recovery of petroleum oil. More specifically, it is concerned with the prevention of sulfate-reducing bacteria which are active in the plugging of sands and piping of the injection water of such secondary recovery systems.

This invention is thus concerned with a process of inhibiting bacteria growth in the recovery of oil from oil-bearing strata by means of flood water taking place in the presence of anaerobic sulfate-reducing bacteria and in the presence of soluble ferrous salts. The process is characterized by being conducted in the presence of a solvent solution of a bactericide being a mixture of not less than 40% and not over 60% by weight of an amino imidazoline of the structure

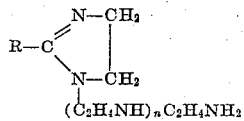

in which R is a hydrocarbon having not less than 13 carbon atoms and not over 22 carbon atoms, and $n$ is an integer not greater than 2 and including zero; and not less than 40% and not over 60% by weight of an amido imidazoline of the structure

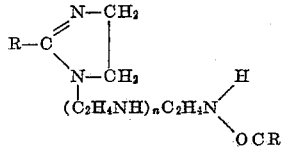

wherein R has its previous significance and the occurrences of R in the amido imidazoline may be different. The mixture is neutralized with a low molal water soluble carboxy acid having not over 6 carbon atoms in the approximate ratio of 2 moles of acid for each mole of imidazoline compound present.

The invention will be described particularly from what appears to be by far its most important use, to wit, to control sulfate reducing bacteria in connection with the recovery of oil from subterranean oil-bearing strata, and particularly those found in the piping systems. The use of an additive in flooding processes for recovery of oil from subterranean oil-bearing strata is described in U. S. Patent 2,233,381 dated February 25, 1941 to De Groote and Keiser.

Over a period of time it has been recognized that various additives may be added to flood water in such oil recovery procedure in order to obtain certain benefits or advantages. For instance, it has been proposed to add an acid in order to alter the pH of the water. See "Producers Monthly," vol. 9 (1945) #12, pp. 19–23. Along with the addition of acid, of course, it has been proposed to use a corrosion inhibiting agent. It has also been proposed to use a material such as a sequestering agent which prevents precipitation of calcium and manesium salts. It has been proposed to add materials which would lower the surface tension of the water. It has been proposed to add agents which would increase the wettability of the flood water for the sand and thus loosen the oil. It has been proposed to employ materials which have bactericidal or fungicidal action. It has been proposed to add materials which prevent the formation of emulsions in the subterranean strata. It has been proposed to use chlorine, formaldehyde or similar products.

The addition of agents to flood water has been proposed for other purposes such as deflocculants so as to be certain that any insoluble material is suspended in the flood system and does not clog the system at any point.

At times it has been proposed to add an agent or additive or chemical compound which, although perhaps a compromise, was beneficial in more than a single respect, i. e., was polyfunctionally active and advantageous.

The present invention is concerned in its more important aspect with the process of bacterial control in sand flooding procedure and more specifically in the control of sulfate-reducing bacteria.

As to the prevention of microbiological growths in water flood operation see "Producers Monthly," volume 11, (1947), #12, pages 21 to 26. This article states "Bacterial Plugging of Sands "Numerous observations may be cited which indicate that bacteria are very effective in causing a plugging of sand faces in water input wells.

"In the East Texas field where brines are being injected back into the sands in order to prevent stream pollution and to help maintain the reservoir pressure it has been found necessary to treat the injected water to prevent growth of bacteria, particularly sulfate-reducing bacteria which are active in plugging the sands in the injection wells. Large periodic doses of chlorine, or formaldehyde have been found to be beneficial in most cases but not entirely satisfactory in correcting the trouble."

One class of bactericidal material is exemplified by high molal amino compounds. Note, for example, those described in the article in the "Producers Monthly" immediately aforementioned. More specifically, a class of high molal amino compounds, some of which have bactericidal properties are the cyclic amidines. The present invention is concerned with one species of a sub-genus of the genus cyclic amidines. Cyclic amidines can include both five-membered rings in which a radical such as

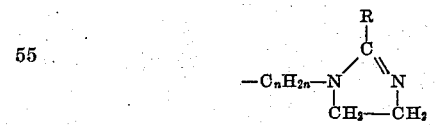

appears and also the six-membered ring radical such as

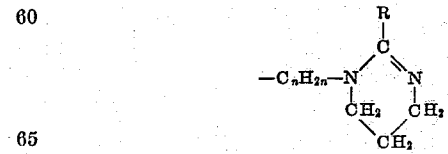

The present invention is limited to a species of the first mentioned sub-genus, to wit, the imidazolines.

Imidazolines can be prepared from a number of polyamines such as ethylene diamine, diethylene triamine, triethylene tetramine, tetraethylene pentamine and, for that matter, higher polyethylene amines in which six or seven nitrogen atoms appear. Products may also be prepared from 1,2-propylene diamine. The various amines above described are frequently reacted with one mole of an alkylene oxide such as ethylene oxide, propylene oxide, butylene oxide, styrene oxide, allyl glycidyl ether, glycidyl isopropyl ether, glycidyl phenyl ether, etc., to yield a polyamine variant which can readily be converted into an imidazoline. At least one of these, sold in substantial quantity for various purposes, includes an imidazoline nucleus. This particular compound is hydroxyethyl ethylene diamine. Another similar compound is N-hydroxyethyl propylene diamine.

Imidazolines are prepared by combining suitable amines as above described with monocarboxy acids, dicarboxy acids or a combination of both. The present invention is concerned with derivatives of monocarboxy acids. Furthermore, the preferred aspect of the present invention is limited to the use of monocarboxy acids having at least 13 and not over 22 carbon atoms. The invention is limited to the use of straight-chain fatty acids which may or may not be unsaturated, for instance, oleic acid or stearic acid. The present invention as far as either amino imidazolines are concerned, is limited to the use of unsubstituted polyethylene amines as reactants with the proviso that such amines have at least three nitrogen atoms and not over five. Thus, the amine reactants employed are exclusively diethylene triamine, triethylene tetramine and tetraethylene pentamine. Referring to the reaction between a higher fatty acid and a polyamine of the kind described having 3, 4 or 5 nitrogen atoms it is obvious that one can obtain a variety of derivatives and frequently a cogeneric mixture in which this derivative appears. The simplest reaction between a polyamine of the kind herein employed and a fatty acid is the formation of a salt by combination with one or more moles of a higher fatty acid. One can obviously form an amide and an amide salt. Similarly, one can form a diamide in which two amido radicals appear in the terminal position. One can convert such diamide into an amido imidazoline or into a diamido imidazoline. One can also form an amino imidazoline by converting the monoamide into the monoimidazoline in order to emphasize that there is a basic terminal group and also to emphasize that the compound is a derivative of the imidazoline class. The present invention as far as one component of the bactericide employed is concerned, is limited to the use of imidazolines derived from the above-enumerated reactants and may be indicated by the following formula

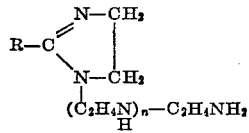

in which $n$ represents the numeral 0, 1, or 2, and R is a hydrocarbon derived exclusively from higher fatty acids having at least 13 and not over 22 carbon atoms including unsaturated fatty acids. The other component is the comparable amido imidazoline. Furthermore, salt formation with a low molal carboxy acid enters into the final composition.

Such products, i. e., the imidazolines, are well-known and have been described in a large number of patents as, for example, U. S. Patent 2,589,198 dated March 11, 1952, to Monson. Such amino imidazolines are obtained by various procedures, one being to convert the amine into a hydrochloride, form the imidazoline and then liberate the free base. Another procedure is to use a large excess of amine and obtain the amino imidazoline substantially free from other cogeneric materials. Any suitable procedure can be employed and the amino imidazoline is preferably of at least technically or commercially pure grade, i. e., containing little or no cogeneric materials.

Attention is directed to the fact that the amino imidazolines herein employed are characterized by being substantially nontoxic where minimum amounts are used and also comparatively harmless from a number of factors involved. Furthermore, they are operationally compatible, i. e., are not affected by the pH of the water, the addition of a surfactant such as a non-ionic surface active agent, the addition of a corrosion inhibitor or the like. Furthermore, they are effective in many cases at ratios which are a fraction of those which have been considered normally acceptable; for instance, up to 15 p. p. m. In the case of the amino imidazolines two or three parts per million are sufficient. Furthermore, these amino imidazolines as such or in the salt form as particularly described (salts of lower fatty acids such as acetic acid), and particularly at times in connection with a non-ionic wetting agent, have advantages as far as distribution between the oil and water phase are concerned.

All of this has been emphasized in an article entitled "The role of microorganisms" by R. C. Allred. This appeared in "Producers Monthly," volume 18, No. 4, pages 18 to 22.

"III.—Factors To Consider in Choosing a Bactericide

"In the final choice of a bectericide, factors other than economics and efficiency must also be taken into consideration.

"A factor that must be considered in the selection of a bactericide is that of toxicity. In event the water may possibly be used for drinking by either humans or animals, the concentration of bactericide used for sterilization must be non-toxic. Since all bactericides are toxic in high concentrations, one should be realistic when approaching this problem. A bactericide should not be discarded because it is toxic in concentrations above 100 p. p. m. when the highest concentration that will be used in water is 15 p. p. m.

"Another factor that is closely related to toxicity is that of ease of handling. If the compound is so toxic that field personnel must wear rubber clothing, masks, and goggles when handling concentrated solutions, or if there is danger of serious burns when workmen are exposed to the material, then the use of such a compound could be questioned. Some compounds that are purchased as a flake or powder can cause a serious dust hazard for the workmen resulting in nose and throat irritations.

"The pH of the water system is a factor that must be considered. Some bactericides are dependent upon pH, being effective in waters slightly acid in nature while ineffective in alkaline waters. pH also affects the solubility of bactericides; a compound may be soluble at a high or alkaline pH while in acid waters become insoluble and precipitate out, leaving the water unprotected.

"An important point that should be mentioned is the relative solubility of the bactericide in water and oil. Our experience has shown that certain types of compounds such as amines and quaternaries are more soluble in oil than in water at low concentrations. When these compounds are used in systems that carry an oil film on the filters, poor bacterial control can be expected since they will be extracted from the water by the oil film. This point will be discussed more fully in another part of this paper.

"Finally, the bactericide should be compatible with all other chemicals used in the water system."

Since the ring radical is generally considered monobasic and the terminal primary amine radical monobasic, the herein described amino imidazolines are at least dibasic, and where reference has been made to salts of acetic acid, lactic acid, propionic acid, hydroxyacetic acid, diglycolic acid, ethylene bis(glycolic acid) it is understood that such salts, particularly salts which increase the water solubility are included in the hereto appended claims wherever reference is made to the amino imidazolines as such.

As far as we are aware, if the price per pound of all cyclic amidines and more specifically imidazolines were the same, the most desirable compound for the present purpose would be the previously described amidine of the structure.

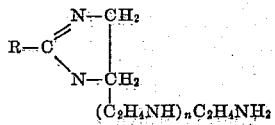

in which the various characters have their previous significance. First of all, such amidines appear to be more effective than the comparable derivative having a 6-membered ring. They are more effective than amidine in which the terminal primary amino group has been altered by the introduction, for example, of a hydroxyethyl or hydroxypropyl group, or the like. For instance, they are definitely better than an amidine which was derived from a diamine and particularly a diamine having a hydroxyalkyl derivative as, for example, from

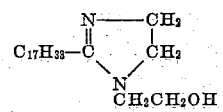

To obtain such amino imidazolines in comparatively technically pure form or a commercially pure form is expensive because the procedure generally requires the conversion of the fatty acid into a low molal ester, such as the methyl ester, ethyl ester, or propyl ester, followed by reaction with a polyamine, such as diethylene triamine, triethylenetetramine, tetraethylenepentamine, or the like, in the molal ratio of 5 to 10 moles of the amine for each mole of ester. The reaction is then distilled to remove the excess amine.

Note what has been said previously in very considerable detail as to the numerous limitaitons and conditions which must be met in choosing a bactericide. The amino imidazolines in technically pure, chemically pure form meet these requirements.

On the other hand it is comparatively easy to prepare an amido imidazoline by reacting 2 moles of a fatty acid with one mole of a selected amine to form a diamide and then to heat the product so as to remove another mole of water. For obvious reasons technically pure amido imidazolines as differentiated from amino imidazolines and derived from the same reactants are available at one-third or one-half of the cost of the amino derivative.

Amido imidazolines are considered comparatively poor or weak bactericides in comparison with the amino derivatives. The reason is obscure in part and is a matter of speculation only. As far as we are aware no one has proposed to use technically pure amido imidazolines as industrial bactericides particularly in sand flooding operations of the kind herein described, or if employed they are comparatively ineffective.

The amido imidazolines derived from low molal acids, for instance, acetic acid, propionic acid, or the like, are fairly water soluble but show little or no bactericidal action at all. As the molecular weight of the group identified by R increases the bactericidal action seems to increase and there is a measurable change when R has approximately 7 carbon atoms or thereabouts. However, as R increases even further in the number of carbon atoms contained, the product becomes water insoluble and thus the amido imidazolines of the kind herein described where R has 13 to 22 carbon atoms, are comparatively ineffective as bactericides, and this is true even though a low molal acid is added to convert basic nitrogen into a salt form such as the acetate, lactate, etc. We have found if we prepare a technically pure or commercially pure grade of an amino imidazoline of the structure

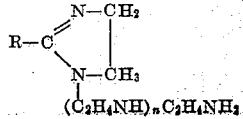

in which the various characters have their previous significance, and also prepare a comparable amido imidazoline of the structure

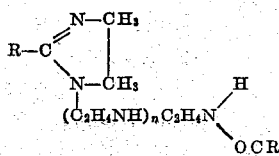

in which the characters have their previous significance, and then mix the two so that the amino imidazoline supplies 40% to 60% by weight of the mixture and the difference is the imido imidazoline, said mixture, when converted into a salt form by addition of a low molal water soluble carboxy acid having not over 6 carbon atoms, in the approximate ratio of 2 moles of acid for each mole of imidazoline compound, and dissolved 30% to 50% by weight in water and isopropanol, is an effective imidazoline bactericide, and particularly one which is unusually effective in water flooding operations involving the difficulties encountered by the presence of anaerobic sulfate-reducing bacteria. We have no explanation of the effectiveness of the mixture. We know such mixture approximates the effectiveness of the much more expensive amino imidazoline when used by itself. For instance, we can prepare a mixture of approximately a fifty-fifty basis at a fraction of the cost of producing the amino imidazoline in substantially technically or commercially pure form. If one cares to employ a procedure in which the two reactants are produced cogenerically, although the leeway in the ratios obtainable is somewhat limited, one can produce a suitable industrial bactericide of the kind described at less than one-half the cost of the comparable amino imidazoline and have a bactericide which is approximately 65% to 80% as good for flooding processes as the technically pure or commercially pure amino imidazoline, whether employed as such or in the form of one of the salts herein mentioned. The present invention is concerned with this particular unlooked-for effectiveness.

Thus a very important aspect of the process of the present invention is the prevention of precipitates such as elemental sulfur and sulfide-formed precipitates caused by the activity of anaerobic sulfate-reducing bacteria in a flooding system containing soluble ferrous salts.

It is to be noted that the two occurrences of R in the amido imidazoline need not be identical. In other words one could convert an amino imidazoline derived from one fatty acid into an amido imidazoline, using another fatty acid or its equivalent, such as an ester or anhydride, etc. However, our preference is that both occurrences of R be identical, i. e., that the fatty acid or its equivalent that supplies the radical R attached to the carbon atom in the ring be identical with that which supplies the R in the amido radical.

One need not employ a single amine but the products obtained, whether the amino imidazoline or the amido imidazoline, or both, may be derived from more than one amine. For instance, we have prepared an amino imidazoline of the structure

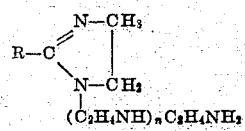

in which in one-third of the product n was zero and in another one-third it was one, and in another one-third it was two; and likewise we have prepared a mixture of the amido imidazoline of the structure

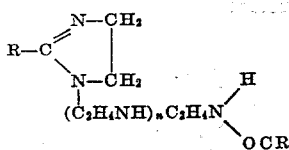

in which in approximately one-third of the product $n$ was zero, in another one-third it was one, and in another one-third $n$ was two; and we have used such preliminarily mixed reactants in the subsequent mixture, which was then neutralized as noted and preferably with a low molal hydroxy acid, such as hydroxyacetic acid or lactic acid, or gluconic acid.

Here, again, conventional procedures may be used employing mixed amines in which one obtains a cogeneric mixture representing suitable proportions of the amino imidazoline and the amido imidazoline but there is a limit to the variations which can be so obtained.

It is unnecessary to point out that one can prepare a cogeneric mixture and add some technically pure or commercially pure amino imidazoline to the cogeneric mixture or one can prepare a technically pure or commercially pure amido imidazoline and add it to a commercial mixture. The method of deriving the specified mixture is immaterial. It is also immaterial if appropriate neutralization, i. e., salt formation, takes place prior to mixing since obviously the same product would be obtained. In other words, in the hereto appended claims reference to neutralization with a low molal acid is not limited to neutralization after admixture but the appropriate combination may be obtained by neutralization in part or entirely, prior to admixture.

Table I shows a substantial number of suitable amino imidazolines. Table II shows a comparable list of suitable amido imidazolines. The suitable low molal acids are those previously specified, along with gluconic, citric, chloroacetic, and butyric.

The imidazolines are combined in proportions as indicated by the examples in Table III. Having obtained such mixed amino and amido imidazoline compounds they are neutralized with various acids or, for that matter mixtures of acids as indicated by the examples in Table IV. The products described in tabular form in Table IV are those which are particularly suitable for the herein described purpose. It is immaterial as to the method of manufacture and it is immaterial at what point salt formation takes place, i. e., whether salt formation is the final step or an intermediate step in which mixing of the ingredients in salt forms becomes the final step. Also, it has been pointed out it is immaterial as to the method of getting the desired predetermined mixture of high molal amino compounds.

Again, it is to be emphasized that all the desired factors which appear in a commercially or technically pure amino imidazoline and have been pointed out in connection with the subject matter dealing with the bactericide, also apply with equal force and effect to the herein described mixtures. In other words, the herein described mixtures, or perhaps better still, salt mixtures, have all these same desirable characteristics to approximately the same degree.

The ethylene polyamines which may be employed are, as stated, triamine, tetramine, and pentamine. There is this difference between the use of the triamine on one hand and the tetramine or pentamine on the other hand; the triamine yields an amino imidazoline and an amido imidazoline. It cannot yield a di-imidazoline since there are less than 4 nitrogen atoms. However, as is well known the tetramine or pentamine, either one, can yield a di-imidazoline by further dehydration, for example, of the amido imidazoline. Certain procedures employed in the manufacture of an amido imidazoline invariably and inevitably produce some di-imidazoline provided the polyamine employed meets the structural requirements. There is no objection to the presence of comparatively small amounts of the di-imidazoline in the bactericide and it does not have to be eliminated for the present purpose. Indeed, we have found that if the di-imidazoline is prepared from a suitable polyamine it may be added to the binary mixture of the kind herein described and one obtains a ternary mixture which may give a performance at least as good as, and perhaps in some instances even better, than the binary mixture when employed as a bactericide. The amount of di-imidazoline present in such mixtures may vary from 10% to approximately 35%, the other two components being in substantially the ratio to each other as indicated in the present invention. However, this ternary mixture, i. e., having present an amino imidazoline, an amido imidazoline, and a di-imidazoline, is not part of the present invention.

In the hereto appended claims reference to R being a hydrocarbon is intended to include the radical R being derived from ricinoleic acid, fatty acids of oiticica oil and the like where actually the hydrocarbon chain does include an oxygen atom. The reason is that for the herein described purpose R is still essentially hydrocarbon and is not affected by the presence of the oxygen atom, in either instance or in similar instances.

TABLE I

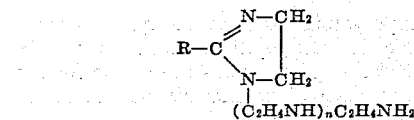

| Ex. No. | R | $n$ |
|---|---|---|
| 1a | $C_{13}H_{27}$ | 0 |
| 2a | $C_{15}H_{31}$ | 1 |
| 3a | $C_{17}H_{35}$ | 2 |
| 4a | $C_{19}H_{39}$ | 0 |
| 5a | $C_{21}H_{43}$ | 1 |
| 6a | $C_{13}H_{25}$ | 2 |
| 7a | $C_{15}H_{29}$ | 0 |
| 8a | $C_{17}H_{33}$ | 1 |
| 9a | $C_{19}H_{37}$ | 2 |
| 10a | $C_{21}H_{41}$ | 0 |
| 11a | $C_{17}H_{33}O$ | 1 |
| 12a | $C_{17}H_{31}$ | 2 |
| 13a | $C_{17}H_{29}$ | 0 |
| 14a | $C_{17}H_{27}$ | 1 |
| 15a | $C_{19}H_{31}$ | 2 |
| 16a | $C_{21}H_{35}$ | 0 |
| 17a | $C_{17}H_{35}$ | 1 |
| 18a | $C_{17}H_{33}$ | 2 |
| 19a | $C_{17}H_{31}$ | 0 |
| 20a | $C_{17}H_{29}$ | 1 |

TABLE II

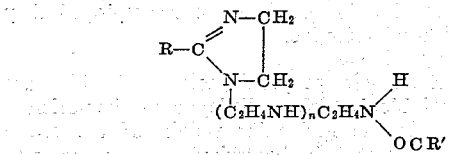

| Ex. No. | R | R' | $n$ |
|---|---|---|---|
| 1b | $C_{13}H_{27}$ | $C_{13}H_{27}$ | 0 |
| 2b | $C_{15}H_{31}$ | $C_{15}H_{31}$ | 1 |
| 3b | $C_{17}H_{35}$ | $C_{17}H_{35}$ | 2 |
| 4b | $C_{19}H_{39}$ | $C_{19}H_{31}$ | 0 |
| 5b | $C_{21}H_{43}$ | $C_{13}H_{27}$ | 1 |
| 6b | $C_{13}H_{25}$ | $C_{13}H_{25}$ | 2 |
| 7b | $C_{15}H_{29}$ | $C_{15}H_{29}$ | 0 |
| 8b | $C_{17}H_{33}$ | $C_{17}H_{33}$ | 1 |
| 9b | $C_{19}H_{37}$ | $C_{13}H_{25}$ | 2 |
| 10b | $C_{21}H_{41}$ | $C_{21}H_{35}$ | 0 |
| 11b | $C_{17}H_{33}O$ | $C_{17}H_{33}O$ | 1 |
| 12b | $C_{17}H_{31}$ | $C_{17}H_{35}$ | 2 |
| 13b | $C_{17}H_{29}$ | $C_{17}H_{35}$ | 0 |
| 14b | $C_{17}H_{27}$ | $C_{17}H_{27}$ | 1 |
| 15b | $C_{19}H_{31}$ | $C_{19}H_{31}$ | 2 |
| 16b | $C_{21}H_{35}$ | $C_{21}H_{35}$ | 0 |
| 17b | $C_{17}H_{35}$ | $C_{17}H_{29}$ | 1 |
| 18b | $C_{17}H_{33}$ | $C_{17}H_{33}$ | 2 |
| 19b | $C_{17}H_{31}$ | $C_{17}H_{31}$ | 0 |
| 20b | $C_{17}H_{29}$ | $C_{17}H_{29}$ | 1 |

TABLE III

| Ex. No. | Amino-imidazoline from Table I, Example No. | Percentage by Wt. in Mixture | Amido-imidazoline from Table II, Example No. | Percentage by Wt. in Mixture |
|---|---|---|---|---|
| 1c | 1a | 40 | 1b | 60 |
| 2c | 2a | 50 | 2b | 50 |
| 3c | 3a | 60 | 3b | 40 |
| 4c | 4a | 40 | 4b | 50 |
| 5c | 5a | 50 | 5b | 40 |
| 6c | 6a | 60 | 6b | 40 |
| 7c | 7a | 40 | 7b | 60 |
| 8c | 8a | 50 | 8b | 50 |
| 9c | 9a | 60 | 9b | 40 |
| 10c | 10a | 40 | 10b | 50 |
| 11c | 11a | 50 | 11b | 40 |
| 12c | 12a | 60 | 12b | 40 |
| 13c | 13a | 40 | 13b | 60 |
| 14c | 14a | 50 | 14b | 50 |
| 15c | 15a | 60 | 15b | 40 |
| 16c | 16a | 40 | 16b | 50 |
| 17c | 17a | 50 | 17b | 40 |
| 18c | 18a | 60 | 18b | 40 |
| 19c | 19a | 40 | 19b | 60 |
| 20c | 20a | 50 | 20b | 50 |

In Examples 4c, 5c, 10c, 11c, 16c, and 17c, the di-imidazoline is present as 10% by weight of the mixture.

TABLE IV

| Ex. No. | Imidazoline From Table III, Ex. No. | Moles of low molal acid employed per Mole of Imazoline | Low Molal Carboxy Acid Employed |
|---|---|---|---|
| 1d | 1c | 2.0 | Acetic acid. |
| 2d | 2c | 1.8 | Hydroxyacetic acid. |
| 3d | 3c | 1.5 | Gluconic. |
| 4d | 4c | 1.8 | Lactic. |
| 5d | 5c | 1.5 | Diglycolic. |
| 6d | 6c | 1.5 | Citric. |
| 7d | 7c | 2.0 | Chloracetic. |
| 8d | 8c | 1.8 | Acetic. |
| 9d | 9c | 1.5 | Hydroxyacetic. |
| 10d | 10c | 1.8 | Gluconic. |
| 11d | 11c | 1.5 | Lactic. |
| 12d | 12c | 1.5 | Diglycolic. |
| 13d | 13c | 2.0 | Hydroxyacetic. |
| 14d | 14c | 1.8 | Chloracetic. |
| 15d | 15c | 1.5 | Acetic. |
| 16d | 16c | 1.8 | Citric. |
| 17d | 17c | 1.5 | Gluconic. |
| 18d | 18c | 1.5 | Diglycolic. |
| 19d | 19c | 2.0 | Acetic. |
| 20d | 20c | 1.8 | Hydroxyacetic. |

Other examples of low molal polycarboxylic acids which may be employed are: oxalic, succinic, tartaric, malic, ethylene bis(glycolic), and malonic.

As has been pointed out previously, the bactericides as described herein are particularly suited for use in connection with wetting agents or the like which are sometimes added in order to increase the recovery of oil in a secondary flooding operation. In many instances these products are obtained by the oxyethylation of various hydrophobic materials. We have employed combinations of the herein described bactericides and the oxyethylation products obtained from various well known compounds such as dinonylphenol, nonylphenol, oleic acid, oleic acid amide, etc. In describing the wetting agents in Table V following, we have shown a molal ratio of the amount of ethylene oxide used per mole of initial raw material. All such wetting agents or oxyethylated products are conventional materials. We have used combinations employing from 5% to 30% of the surfactants in combination with various salts as noted. This compatibility of the herein described bactericides with conventional surfactants of this type is a particularly desirable property.

TABLE V
Mixtures with non-ionic wetting agents

| Ex. No. | Employed Salt Mixture of Example No. | Amount, Percent | Wetting Agent Employed | | Amt., Percent |
|---|---|---|---|---|---|
| 1e | 1d | 95 | (Dinonyl phenol) | (10 EtO) | 5 |
| 2e | 2d | 90 | (Nonyl phenol) | (15 EtO) | 10 |
| 3e | 3d | 85 | (Oleic Acid) | (2 EtO) | 15 |
| 4e | 4d | 80 | (Butyl alcohol) | (5 EtO) | 20 |
| 5e | 5d | 75 | (Oleic Acid Amide) | (10 EtO) | 25 |
| 6e | 6d | 70 | (Bis-Amylphenylol 2,2-propane) | (20 EtO) | 30 |
| 7e | 7d | 65 | (Ethyleneglycol Monostearate) | (12 EtO) | 35 |
| 8e | 8d | 95 | (Naphthol) | (10 EtO) | 5 |
| 9e | 9d | 90 | (Octyl phenol) | (18 EtO) | 10 |
| 10e | 10d | 85 | (Lauryl Alcohol) | (30 EtO) | 15 |
| 11e | 11d | 80 | (Dinonyl phenol) | (10 EtO) | 20 |
| 12e | 12d | 75 | (Oleic Acid) | (2 EtO) | 25 |
| 13e | 13d | 95 | (Nonylphenol) | (15 EtO) | 5 |
| 14e | 14d | 90 | (Butyl Alcohol) | (5 EtO) | 10 |
| 15e | 15d | 95 | (Oleic Amide) | (10 EtO) | 5 |
| 16e | 16d | 90 | (Bis-amyl Phenylol Propane) | (20 EtO) | 10 |
| 17e | 17d | 85 | (Ethylene Glycol Monostearate) | (10 EtO) | 15 |
| 18e | 18d | 80 | (Naphthol) | (10 EtO) | 20 |
| 19e | 19d | 75 | (Octyl Phenol) | (18 EtO) | 25 |
| 20e | 20d | 70 | (Lauryl Alcohol) | (30 EtO) | 30 |

It has been emphasized previously that the present invention resides in the fact that a comparatively inexpensive mixture, or at least a much less expensive mixture, is used to accomplish the same thing that one would ordinarily accomplish by means of an amino imidazoline. The particularly unexpected and unlooked for feature in the present invention is the fact that the amido imidazolines, which when used alone have comparatively poor bactericidal or bacteriostatic effect, when mixed with an amino imidazoline give mixtures, even in such instances where the amido imidazoline is employed in a weight ratio of one-and-one-half to one, which are perhaps not quite as good as the amino imidazolines used by themselves, yet are almost as good and enormously better than one would expect based on the normal, bactericidal activity of the imidazoline by itself.

The method of evaluating these compounds is by the test method of R. C. Allred, T. A. Mills, and H. B. Fisher, "Bacteriological techniques applicable to the control of sulfate reducing bacteria in water flooding operations," published in the Producers Monthly, December 1954, pages 31 and 32. The following laboratory results show that the amino imidazoline and amido imidazoline mixtures are 65% to 80% as effective as the pure amino imidazoline of $C_{18}$ acids, against a test species of desulfovibrio desulfuricans isolated from an Oklahoma flood water.

Results illustrating what has been said previously appear in Table VI, following:

TABLE VI

| Compound | Inhibiting Concentration, p. p. m. |
|---|---|
| Lauric Amido Imidazoline | 10 |
| Stearic Amido Imidazoline | 20 |
| Palmitic Amido Imidazoline | 15 |
| Linseed Amido Imidazoline | 10 |
| Soya Amido Imidazoline | 10 |
| Lauric Amino Imidazoline | 10 |
| Stearic Amino Imidazoline | 2 |
| Palmitic Amino Imidazoline | 2 |
| Linseed Amino Imidazoline | 2 |
| Soya Amino Imidazoline | 2 |
| Mixtures: | |
| 60% Linseed Amido Imidazoline / 40% Linseed Amino Imidazoline | 2½ |
| 50% Linseed Amido Imidazoline / 50% Linseed Amino Imidazoline | 2½ |
| 40% Linseed Amido Imidazoline / 60% Linseed Amino Imidazoline | 2½ |
| 60% Soya Amido Imidazoline / 40% Soya Amino Imidazoline | 2½ |
| 40% Soya Amido Imidazoline / 60% Soya Amino Imidazoline | 3 |
| For Comparison: | |
| 50% Trimethyl Soya Ammonium Chloride / 50% Dimethyl Dicoco Ammonium Chloride | 2½ |
| Sodium Pentachlorophenate | 10 |

The cogeneric neutralized mixture is a water-soluble product for use in fresh water or brine systems for the inhibition of growth of both anaerobic and aerobic organisms, but is particularly applicable in controlling the sulfate reducing organisms (desulfovibrio desulfuricans and related species). This mixture is unique in that its effectiveness is not impaired by calcium and magnesium ions or high concentrations of other dissolved solids. Also, unlike the quaternaries, the Pseudomonas organisms do not build up a resistance to the described product.

The following illustrates the required concentration of a product such as Example 13e, Table V for one hundred percent kill of the organisms listed.

AEROBIC ORGANISMS

| Organism: | Concentration product |
|---|---|
| E. coli | 3–5 |
| M. pyogenes var. aureus | 2 |
| P. vulgaris | 7–8 |
| S. flava | 2 |
| S. marcescens | 8 |
| A. aerogenes | 3–5 |
| B. cereus | 3–5 |
| B. subtilis | 2–3 |
| Ps. aeruginosa | 7–8 |

SULFATE REDUCERS (DESULFOVIBRIO DESULFURICANS)

| Illinois Strain "A" | 2–3 |
|---|---|
| Illinois Strain "B" | 3–5 |
| Oklahoma Strain "A" | 2–3 |
| Talco Texas Strain | 2–3 |
| Pennsylvania Strain "A" | 3–5 |
| Pennsylvania Strain "B" | 8 |

Our product in a diluted form is used in the same manner that other bactericides are used in water flooding. A description of the procedure usually followed using such a product is given in an article entitled "The role of microorganisms" by R. C. Allred, in Producers Monthly, volume 18, No. 4, pages 18–22.

The usual procedure for use of this product is to "slug" treat the water system with 50 parts per million of the diluted product and then reduce to the normal treating rate of 10–15 parts per million of a diluted product, continuously injected. Sampling and checking the water for sulfate reducers will show whether the chemical concentration need be raised or may be lowered to effectively curtail the bacterial growth to a low general bacterial count and effect and a practically complete elimination of sulfate reducing bacteria from the water.

This is the common procedure used generally by operators of water treatment plants preparing injection water for water floods.

As to further information regarding the use of bactericides in treatment of flood water for secondary recovery, see the following references:

"Bacteria and corrosion control," Joseph N. Breston, The Oil and Gas Journal, August 25, 1949, pp. 96 et seq.

"Effect of pH on water intake rates of oil sands," J. N. Breston and W. E. Johnson. The Producers Monthly, vol. 0., No. 12, October 1945, pp. 19–23.

"Field test of corrosion inhibitor for low —pH flood water," J. N. Breston and Kenneth Barton. The Oil and Gas Journal, December 6, 1947. pp. 91–92, 95–96.

"Further field test results on use of corrosion inhibitors and bactericides for secondary flood waters" E. T. Heck, J. K. Barton, and W. E. Howell, The Producers Monthly, May 1949.

"Prevention of microbiological growths in water flood operations," Jay V. Beck. The Producers Monthly, vol. 11, No. 12, 1947, pp. 21–26.

The herein described bactericidal mixtures also are effective as algaecides and slimicides. This means that if the flooding system involves an open pond or pool as is frequently the case this particular property has a distinctive advantage.

Specific attention is directed to the article by Torrey entitled "Preparation of water for injection into water reservoirs," which appeared in the Journal of Petroleum Technology, volume 7, No. 4, page 9 (April 1955).

Having thus described our invention, what we claim as new and desire to obtain by Letters Patent, is

1. In a flooding process for the recovery of oil from oil-bearing strata taking place in the presence of anaerobic sulfate-reducing bacteria and soluble ferrous salts, the improvement which comprises flooding the oil-bearing strata with an aqueous liquid containing a bactericide consisting essentially of a mixture of not less than 40% and not over 60% by weight of an amino imidazoline of the structure

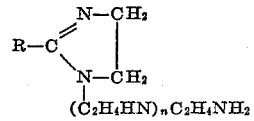

in which R is a hydrocarbon radical having not less than 13 carbon atoms and not over 22 carbon atoms, and $n$ is an integer not greater than 2 and including zero; and not less than 40% and not over 60% by weight of an amido imidazoline of the structure

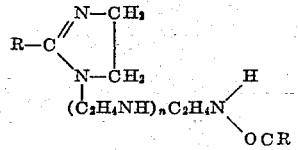

where each R in the amido imidazoline structure is a hydrocarbon radical having not less than 13 carbon atoms and not over 22 carbon atoms; with the proviso that said mixture is neutralized with a low molal water soluble carboxy acid having not over 6 carbon atoms in the approximate ratio of 2 moles of acid for each mole of imidazoline compound present.

2. The process of claim 1 with the proviso that each R is derived from an unsaturated fatty acid.

3. The process of claim 1 with the proviso that each R is derived from an unsaturated fatty acid having 18 carbon atoms.

4. The process of claim 1 with the proviso that the amino imidazoline and amido imidazoline are each obtained from a mixture of polyethylene amines.

5. The process of claim 4 with the proviso that the amino imidazoline and amido imidazoline are each obtained from a mixture of polyethylene amines being approximately one-third diethylene triamine, one-third triethylene tetramine, and one-third tetraethylene pentamine.

6. The process of claim 4 with the proviso that the amino imidazoline and amido imidazoline are each obtained from a mixture of polyethylene amines being approximately one-third diethylene triamine, one-third triethylene tetramine, and one-third tetraethylene pentamine, with the further proviso that the low molal carboxy acid be glycolic acid.

7. The process of claim 4 with the proviso that the amino imidazoline and amido imidazoline are each obtained from oleic acid and a mixture of polyethylene amines being approximately one-third diethylene triamine, one-third triethylene tetramine, and one-third tetraethylene pentamine, with the further proviso that the low molal carboxy acid be glycolic acid.

8. A bactericidal composition for anaerobic sulfate-reducing bacteria which consists essentially of a mixture of not less than 40% and not over 60% by weight of an amino imidazoline of the structure

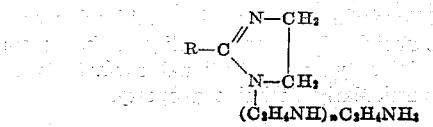

in which R is a hydrocarbon radical having not less than 13 carbon atoms and not over 22 carbon atoms, and $n$ is an integer not greater than 2 and including zero; and not less than 40% and not over 60% by weight of an amido imidazoline of the structure

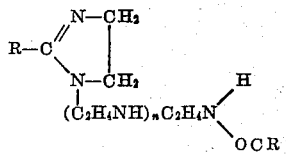

where each R in the amido imidazoline structure is a hydrocarbon radical having not less than 13 carbon atoms and not over 22 carbon aotms; with the proviso that said mixture is neutralized with a low molal water soluble carboxy acid having not over 6 carbon atoms in the approximate ratio of 2 moles of acid for each mole of imidazoline compound present.

9. The composition of claim 8 with the proviso that each R is derived from an unsaturated fatty acid.

10. The composition of claim 8 with the proviso that each R is derived from an unsaturated fatty acid having 18 carbon atoms.

11. The composition of claim 8 with the proviso that the amino imidazoline and amido imidazoline are each obtained from a mixture of polyethylene amines.

12. The composition of claim 8 with the proviso that the amino imidazoline and amido imidazoline are each obtained from a mixture of polyethylene amines being approximately one-third diethylene triamine, one-third triethylene tetramine, and one-third tetraethylene pentamine.

13. The composition of claim 8 with the proviso that the amino imidazoline and amido imidazoline are each obtained from a mixture of polyethylene amines being approximately one-third diethylene triamine, one-third triethylene tetramine, and one-third tetraethylene pentamine, by weight, with the further proviso that the low molal carboxy acid be glycolic acid.

14. The composition of claim 8 with the proviso that the amino imidazoline and amido imidazoline are each obtained from oleic acid and a mixture of polyethylene amines being approximately one-third diethylene triamine, one-third triethylene tetramine, and one-third tetraethylene pentamine, by weight, with the further proviso that the low molal carboxy acid be glycolic acid.

References Cited in the file of this patent

UNITED STATES PATENTS

| | | |
|---|---|---|
| 2,331,594 | Blair | Oct. 12, 1943 |
| 2,356,205 | Blair et al. | Aug. 22, 1944 |
| 2,356,254 | Lehmann et al. | Aug. 22, 1944 |
| 2,540,171 | Kiff | Feb. 6, 1951 |
| 2,733,206 | Prusick et al. | Jan. 31, 1956 |